No. 731,146. PATENTED JUNE 16, 1903.
C. S. WILMETH.
COMBINED AGRICULTURAL MACHINE.
APPLICATION FILED MAR. 12, 1902.
NO MODEL. 6 SHEETS—SHEET 1.
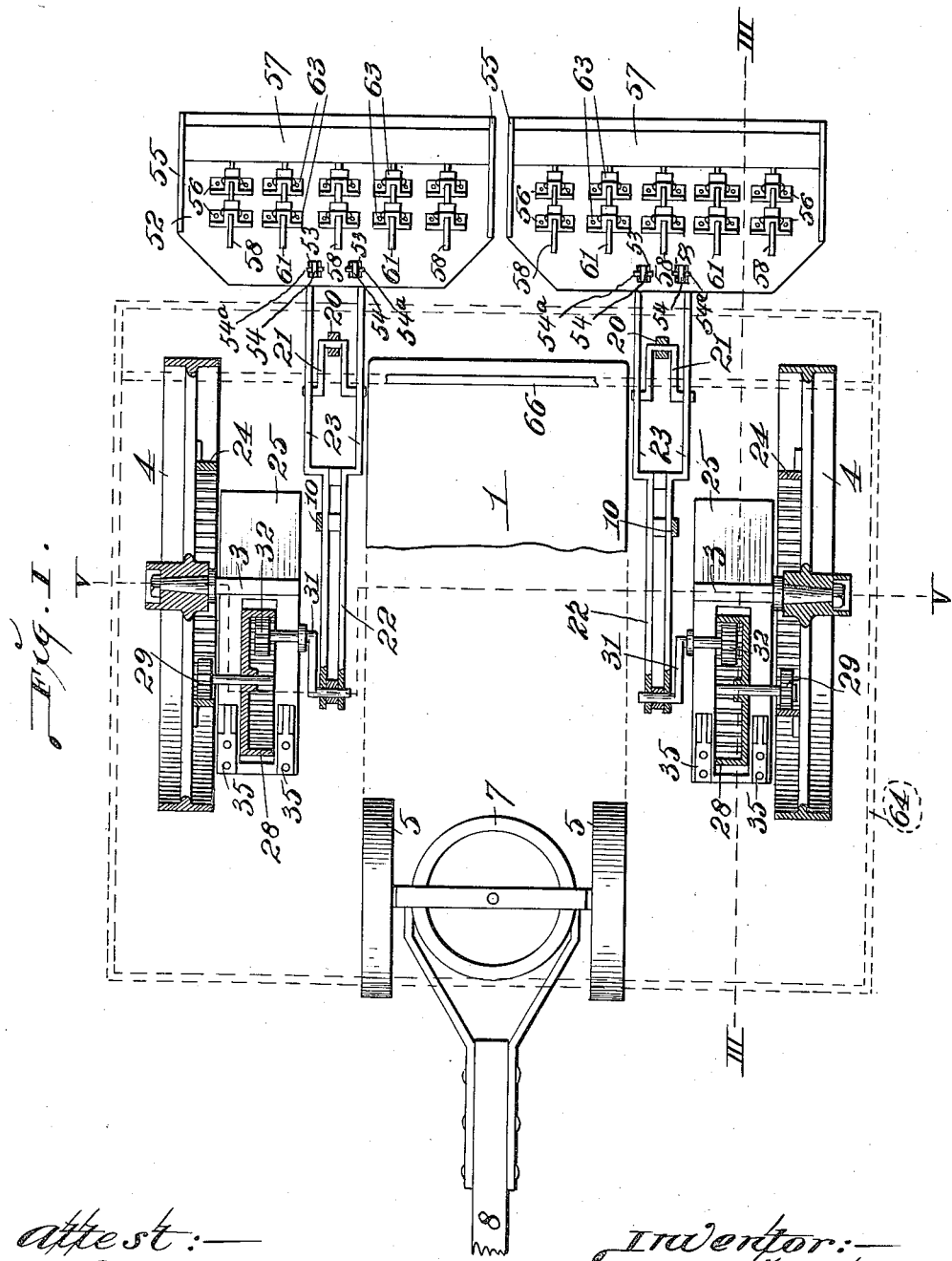

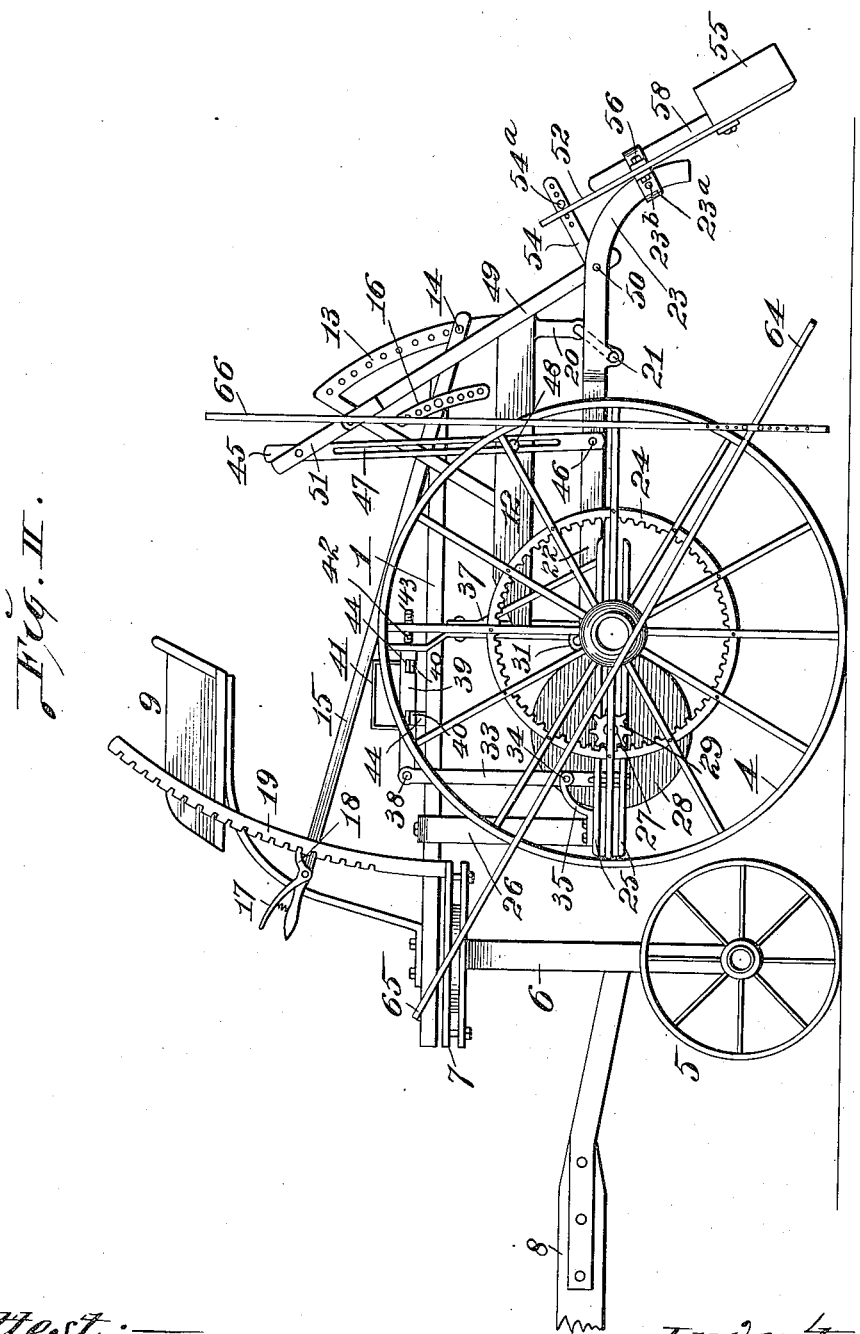

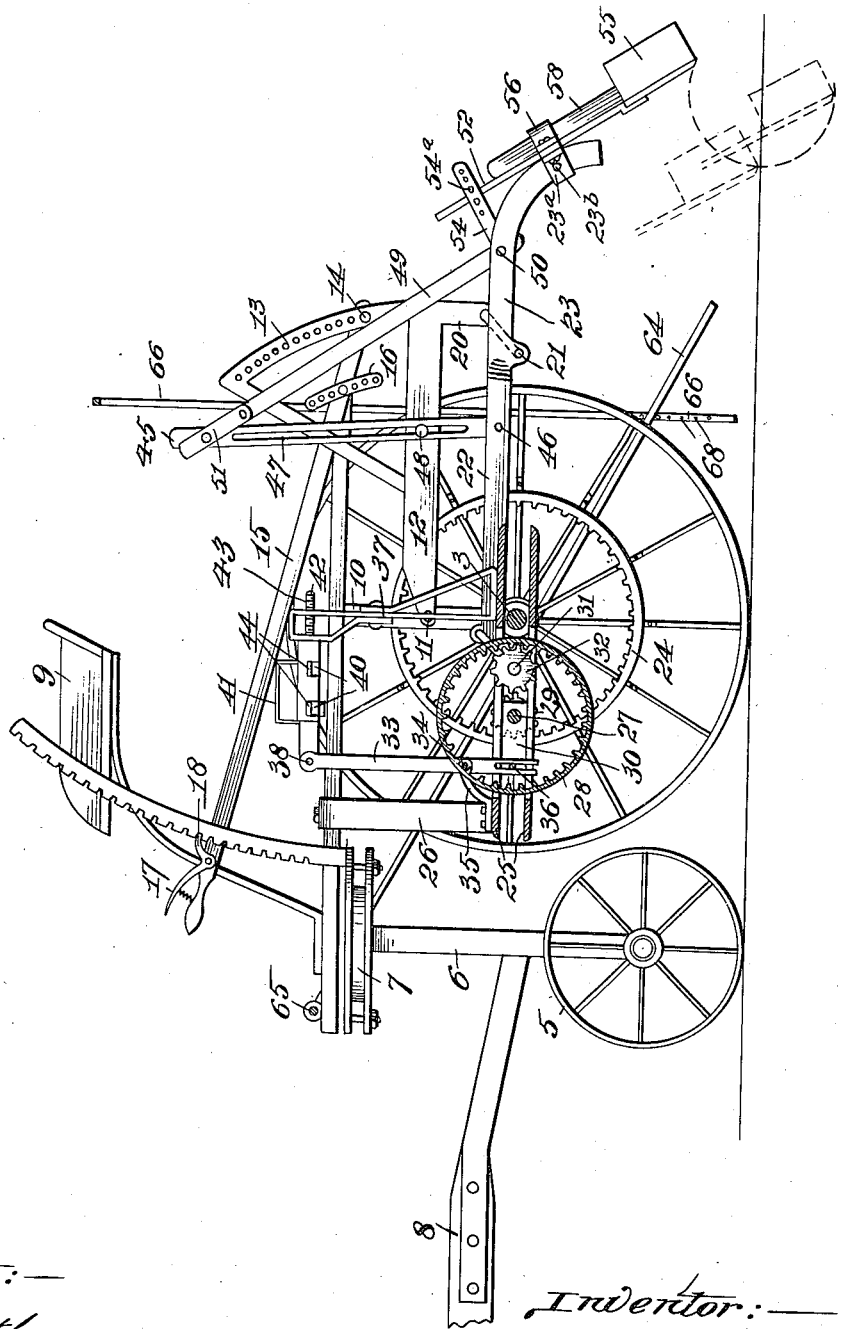

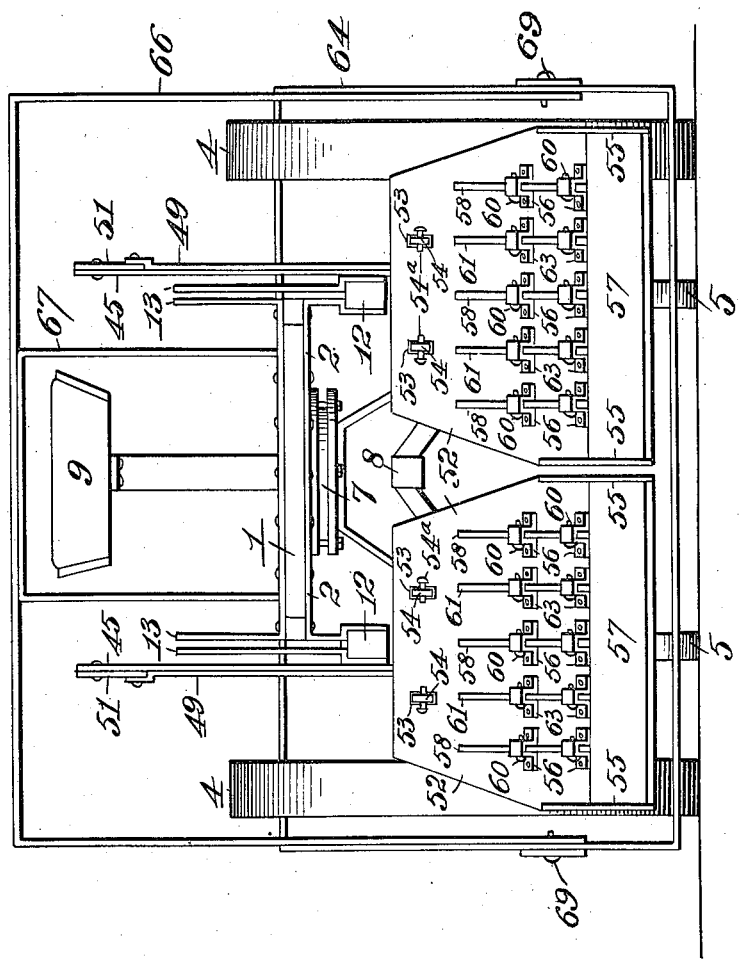

No. 731,146. PATENTED JUNE 16, 1903.
C. S. WILMETH.
COMBINED AGRICULTURAL MACHINE.
APPLICATION FILED MAR. 12, 1902.
NO MODEL. 6 SHEETS—SHEET 5.
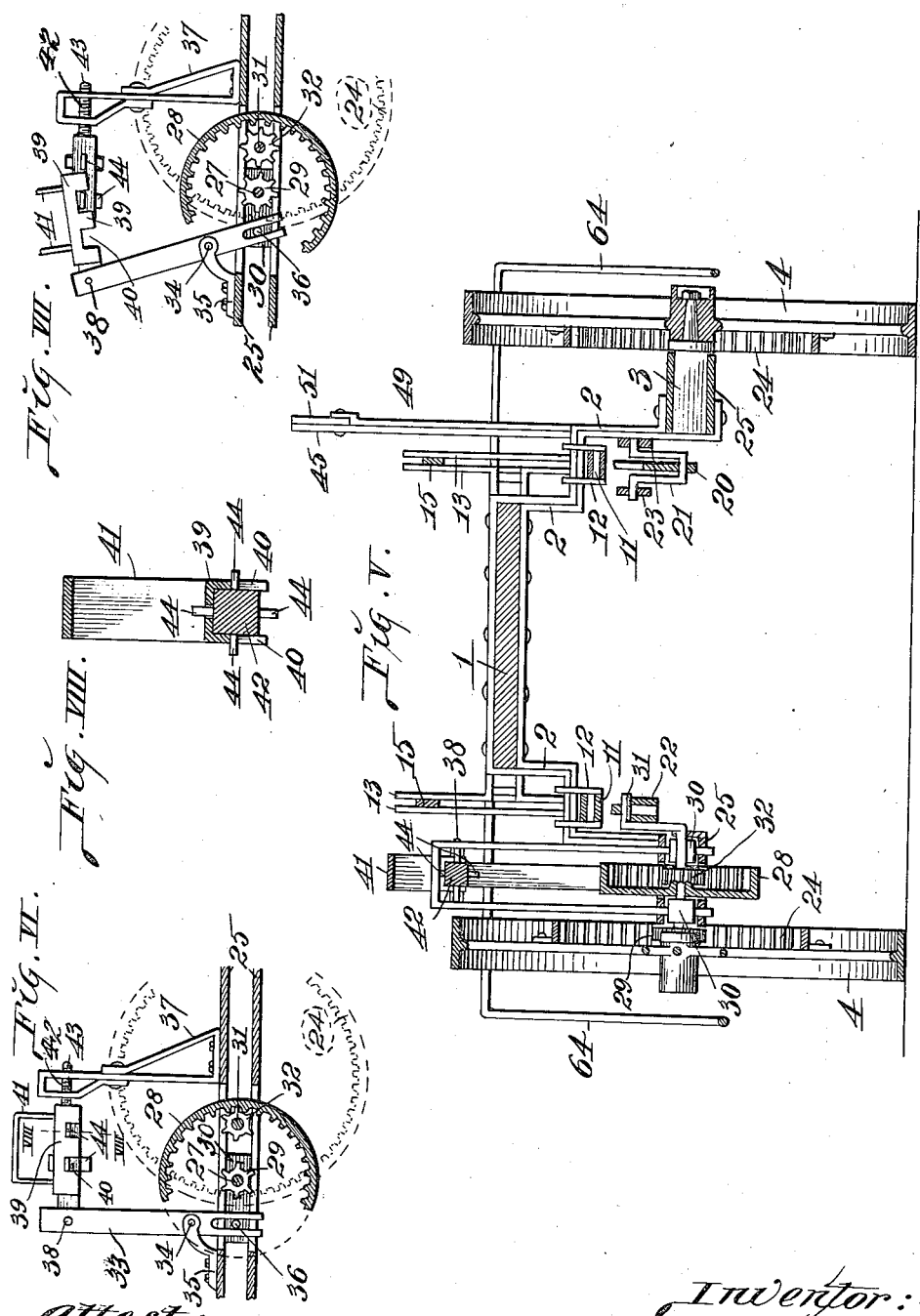

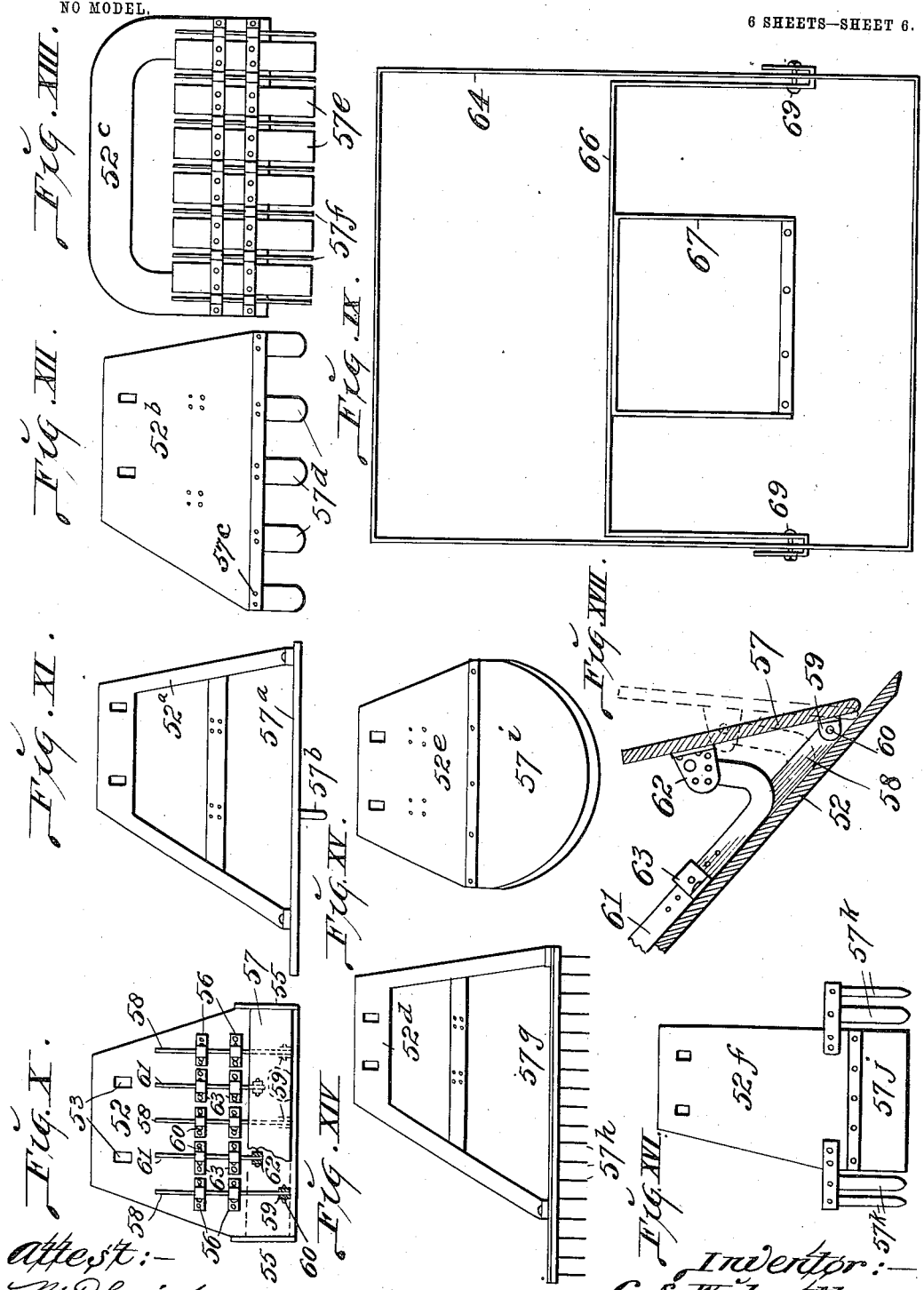

No. 731,146.   
Patented June 16, 1903.

UNITED STATES PATENT OFFICE.

CHARLES S. WILMETH, OF ST. LOUIS, MISSOURI, ASSIGNOR OF ONE-HALF TO HENRY C. KAUFFMAN, OF ST. LOUIS, MISSOURI.

COMBINED AGRICULTURAL MACHINE.

SPECIFICATION forming part of Letters Patent No. 731,146, dated June 16, 1903.

Application filed March 12, 1902. Serial No. 97,856. (No model.)

*To all whom it may concern:*

Be it known that I, CHARLES S. WILMETH, a citizen of the United States, residing in the city of St. Louis, in the State of Missouri, have invented certain new and useful Improvements in a Combined Agricultural Machine, of which the following is a full, clear, and exact description, reference being had to the accompanying drawings, forming part of this specification.

My invention relates to a combined machine for agricultural purposes designed for multiple services in the tilling of soil, the construction of the machine and the parts attachable thereto being such as to render it of utility in breaking ground, pulverizing, harrowing, tamping, and marking the upturned soil and covering small grain and also for depressing weeds, grass, or other growth to be turned under the surface of the ground.

Figure I is a top or plan view of my combined machine. Fig. II is a side elevation of the machine. Fig. III is a view partly in vertical section taken on line III III, Fig. I, and partly in elevation. Fig. IV is a rear elevation of the machine. Fig. V is a vertical transverse sectional view of the machine, taken on the irregular line V V, Fig. I. Fig. VI is an enlarged detail view, partly in elevation and partly in section, of the driving-gear mechanism, the parts being shown in gear. Fig. VII is a view similar to Fig. VI with the parts shown out of gear. Fig. VIII is an enlarged cross-sectional view taken on line VIII VIII, Fig. VI. Fig. IX is a detail top view of the weed-depressing sweep. Figs. X to XVI, inclusive, are detail views of the detachable bits used upon the machine. Fig. XVII is a vertical section of one of the bits and moldboards.

The construction of machine forming the subject-matter of this invention provides for the operation of soil-working bits or members in a circular or rotative manner, whereby the soil is effectually cut up and worked, either by breaking it, cultivating, or otherwise treating it subsequent to the original breaking operation. By the construction that provides for a circular action of the soil-working members I have produced an agricultural apparatus of great merit that acts upon and in the soil in a most effectual manner to thoroughly break it up, put it in condition for the seed to be planted, and capable of other operations in treatment thereof without dragging or rolling upon the ground and with the least degree of frictional contact to render it easy of operation and draft.

1 designates the platform of the machine, (see Fig. V,) having attached thereto an axle-frame 2, that receives the axles 3, mounted in the ground-wheels 4.

5 designates steering-wheels journaled to an upright 6, that is surmounted by a fifth-wheel 7, forming a connection between said upright and the platform of the machine.

8 is a draft-tongue attached to the upright 6.

9 is a seat mounted on the platform 1.

10 designates drop-bars carried by the platform 1, that receive the pivotal connection at 11 (see Fig. III) of carriers 12, by which the soil-working parts of the machine are supported. The carriers 12 are provided with apertured arms 13, either one of the apertures in which is adapted to receive a bolt or pin 14, by which lift-levers 15 are connected to the carriers. The lift-levers 15 are swingingly mounted in brackets 16, that are provided with a series of apertures, into either of which the pivot-pins of the levers may be inserted. By providing the series of apertures in the carrier-arms 13 and brackets 16 the lift-levers may be arranged in varying position in said parts in order to effect greater or less throw of the carrier 12 in the movement of the lift-levers. The forward ends of the lift-levers are provided with spring-latches 17, having toothed heels 18, that are adapted for engagement with vertical racks 19, carried by the platform 1 of the machine.

20 designates hanger-arms extending downwardly from the carriers 12 and adapted to receive the connection of crank-hangers 21, that are loosely hung in the hanger-arms.

22 designates pitmen that are provided with rearwardly-extending arms 23, in which the arms of the hangers 21 are mounted, the hangers being of U shape (seen in Fig. I) to provide for their application to the pitmen.

24 designates internal gears carried by the ground-wheels 4 of the machine.

25 designates horizontal boxes supported at their forward ends from the platform 1 by drop-hangers 26 and having their rear ends mounted upon the axles 3.

27 designates shafts positioned in the horizontal boxes 25 and on which are mounted internal gears 28 and pinions 29, the last named of which are adapted for engagement with the teeth of the internal gear 24. The shafts 27 are journaled in slides 30, (see Figs. V, VI, and VII,) adapted to reciprocate in the boxes 25, upon the movement of which the internal gears 28 and pinions 29 may be shifted for the purpose of throwing the parts of the machine out of gear, as will hereinafter appear.

31 designates crank-shafts mounted in bearings on the boxes 25 and having fixed thereto pinions 32, adapted to mesh with the teeth of the internal gear 28 for the purpose of driving said crank-shafts on the operation of said internal gears when driven by power communicated thereto from the ground-wheels through the internal gears 24 and pinions 29. The crank-shafts 31 are loosely connected to the pitmen 22 to serve as driving means for said pitmen in the operation of the machine in the manner hereinafter set forth. The slides 30, that carry the shafts 27, are shifted in the boxes 25 by the shifting mechanism that will now be described.

33 designates inverted-U-shaped shifters, pivoted at 34 to brackets 35, carried by the boxes 25. The lower ends of the shifters 33 are forked, as seen in Figs. VI and VII, to straddle studs 36 on the slides 30.

37 designates posts mounted upon the boxes 25 and provided with apertured upper ends.

38 designates rock-shafts mounted in the shifters 33 at their upper ends, and 39 designates socket-arms carried by said rock-shafts and provided with notches 40. The socket-arms are provided with handles 41, by which they may be lifted and lowered.

42 designates stems provided with threaded ends 43, that are seated in the threaded apertures of the post 37.

44 designates two series of fingers projecting from the sides of the stems 42, that fit into the notches 40 of the rock-shaft-carried arms 39 to hold said arms from movement on said stem when applied thereto. When the machine is in gear, the rock-shaft-carried arms 39 are moved into the position seen in Fig. VI, so that the notches 40 receive both series of fingers 44 on the stems 42, thereby holding the shifters 33 in upright position, so holding the slides 30 that the pinions 29 are maintained in engagement with the teeth of the internal gear 24, and the internal gear 28 is maintained in engagement with the pinions 32 of the crank-shafts 31. To throw the parts out of gear, the rock-shaft-carried arms 39 are lifted by the handles 41 out of engagement with the fingers 44. The stems 42 and the arms are moved into the position seen in Fig. VII, so that the notches in the rear ends of said arms may be fitted to the fingers 44 at the forward ends of the stems 42, thereby moving the upper ends of the shifters 33 forwardly and causing their lower ends to be thrown rearwardly to carry the slides 30 in a corresponding direction and convey the shafts 27 in a corresponding direction to move the pinions 29 away from the internal gears 24 and the internal gears 28 out of engagement with the pinions 32. When the parts have been so manipulated, the ground-wheels may travel upon the ground in the transportation of the machine without imparting movement to the gearing and the pitmen connected thereto.

For the purpose of causing the pitmen 22 to be operated correctly and the crank-hangers 21 and cranks 31 to operate uniformly and in unison with each other I utilize equalizers that are applied to the pitmen both in front and rear of the crank-hangers 21 and are fulcrumed to the carriers 12, by which the pitmen are supported.

45 designates the forward bars of these equalizers, that are pivoted at 46, forward of the crank-hangers 21, to the pitmen and each of which is provided with a longitudinal slot 47, that receives a fulcrum-pin 48, seated in the carrier, by which the individual pitman corresponding thereto is supported.

49 designates the rear equalizer-bars, that are pivotally connected at 50 to the arms 28 of the pitmen and which are pivotally connected at their upper ends to the forward bars 45, the connection being preferably made through the medium of links 51, the equalizer, composed of the bars 45 and 49, being connected to the pitmen, as stated, and one of the bars having fulcrum connection with the pitman-carrier 12. The rear portion of each pitman is supported by each equalizer in such manner that the crank-hangers 21 are always maintained in a uniform position in relation to the drive-cranks 31 at the forward ends of the pitmen, thus rendering it impossible for the rear end of the pitmen to fall out of alinement with the forward ends.

I will next describe the bits or soil-working members that are used in connection with my machine.

Referring first to what I term "spader-bits" and which are shown in Figs. I, II, III, IV, and X of the drawings, 52 designates the bits connected to the pitman-arms 23 by pivot-clips 23ª, pivoted at 23ᵇ to the pitman-arms 23. (See Figs. II and III.) At the lower end of each bit 52 are rearwardly-turned flanges 55, and mounted on each bit are series of clips 56. 57 designates adjustable moldboards applied to the bits 52, seated within the flanges 55 (see Fig. X) and provided with a series of supporting-rods 58, that are pivotally connected to clips 59 near the lower edges of the moldboards and are adjustably seated in the clips 56 on the bits, in which they are held by pins or bolts 60, as most clearly seen in Fig. XVII. 61 designates adjustment-rods pivoted to clips 62 near the upper edges of the moldboards 57 and movably held in clips 63 on the bits 52, these last-named rods being adapted to be so held in said clips 63 as to effect upward or rearward inclination of the moldboards 57 with relation to the bits, so that they will extend rearwardly therefrom in inclined directions as desirable for their soil-turning action in the ground. In order to obtain desirable inclination of the bits 52, they are pivotally connected to the pitman-arms, as stated, and the apertures 53 therein receive arms 54, carried by the pitman and adapted to receive keys 54$^a$, by which the bits are held in varied inclinations. The spader-bits just described are designed for use in cutting and turning the soil as the first step in preparing it for a crop and also for covering the crop of small grain previously planted, which may be covered at the same time that the soil is cut or broken.

In Fig. XI, I have shown a bit suitable for marking ground, which comprises a frame 52$^a$, that is designed to be attached to the pitmen in the same manner as the bits 52 and has a shoe 57$^a$, provided with a marker-tongue 57$^b$, adapted to produce a groove within the soil in the travel of the machine.

In Fig. XII, I have shown a marker-bit composed of a plate 52$^b$, having a shoe 57$^c$, provided with a series of tamping-tongues 57$^d$, that are adapted to operate upon the ground to press the soil onto seed sown and which may also be of service in marking the soil for the reception of small seeds.

In Fig. XIII, I have shown a digger-bit composed of a frame 52$^c$, to which is affixed a series of broad cutters 57$^e$, intermediate of which are a series of narrow cutters 57$^f$, the cutters being held between straps fixed to the frame 52$^c$.

In Fig. XIV, I have shown a harrow-bit composed of a frame 52$^d$, having a shoe 57$^g$, that is provided with a series of teeth 57$^h$.

In Fig. XV, I have shown a cultivator-bit that is composed of a plate 52$^e$, that has affixed to it a blade 57$^i$.

In Fig. XVI, I have shown a bit composed of a plate 52$^f$, having affixed thereto a blade 57$^j$ and also carrying at the edges of said blade narrow teeth 57$^k$, that are adapted to operate in the soil in conjunction with the blades between them.

64 designates a sweep that is swingingly mounted at 65 upon the forward end of the platform 1 of the machine and extending rearwardly therefrom to a position in the rear of the ground-wheels 4, but forward of the cutter-bits of the machine. This sweep is adapted to move in proximity to the ground, where it serves to depress weeds, stalks, or other growth, in order that they may be readily turned under the soil as it is worked by the bits that subsequently to the passage of the sweep operate therein. The sweep 64 is supported and held by a bit 66, that is mounted on a frame 67, which surmounts the platform 1 and extends downwardly to the rear end of the sweep, which is provided with a series of apertures 68, adapted to receive pins 69, (see Fig. II,) by which the sweep is supported and held.

In the practical use of this machine the pitmen 22 are constantly reciprocated by the driving connection to the crank-axles 31, that are fitted to the forward ends of the pitmen, and the rear ends of the pitmen rising and falling upon the turning of the crank-hangers 21, by which their rear ends are carried. During the reciprocating and rise-and-fall motion of the pitmen the bits carried by said pitmen are constantly moved in a circular direction, as indicated by full and dotted lines, Fig. III, their motion being upwardly, forwardly, and then downwardly into the ground and rearwardly out of the ground, in which action they constantly throw the soil rearwardly in the case of the use of the bits provided with moldboards, while in the use of the bits provided with the other soil-working parts they act upon the soil in a manner that causes thorough pulverizing, tamping, marking, and seed-covering action, all of which will be apparent when the motion imparted to the bits is considered.

I claim as my invention—

1. In an agricultural machine, the combination of ground-wheels, a reciprocatory pitman, means whereby said pitman is supported, a soil-working member carried by said pitman, and means whereby said pitman is driven to impart a circular rotative movement to said soil-working member, substantially as described.

2. In an agricultural machine, the combination of ground-wheels, a pitman, means whereby said pitman is reciprocatorily suspended, a soil-working member carried by said pitman, and gearing interposed between one of said ground-wheels and said pitman adapted to impart reciprocatory movement to said pitman, and rotate said soil-working member circularly, substantially as described.

3. In an agricultural machine, the combination of ground-wheels, a frame supported by said ground-wheels, a carrier attached to said frame, a pitman swingingly suspended from said carrier, a soil-working member carried by said pitman, and driving-gear interposed between one of said ground-wheels and said pitman, whereby said pitman is reciprocated to rotate said soil-working member circularly, substantially as described.

4. In an agricultural machine, the combination of ground-wheels, a frame supported by said ground-wheels, a carrier attached to said frame, a pitman, a revoluble crank-hanger by which said pitman is swingingly suspended from said carrier, and a crank connection between one of said ground-wheels and said pitman, substantially as described.

5. In an agricultural machine, the combination of ground-wheels, a frame supported by said ground-wheels, a carrier pivotally connected to said frame, a pitman, a soil-working member carried by said pitman, a revoluble crank-hanger by which said pitman is swingingly suspended from said carrier and a crank having connection with the forward end of said pitman, and having driving connection with one of said ground-wheels, substantially as described.

6. In an agricultural machine, the combination of ground-wheels, a frame supported by said ground-wheels, a carrier swingingly connected to said frame, means for raising and lowering said carrier, a pitman, a soil-working member carried by said pitman, a revoluble crank-hanger by which said pitman is swingingly suspended from said carrier, a crank connected to the forward end of said pitman, and driving connection for said crank having engagement with one of said ground-wheels, substantially as described.

7. In an agricultural machine, the combination of ground-wheels, a reciprocatory pitman, means for supporting said pitman, a soil-working member carried by said pitman, a moldboard carried by said soil-working member, and means whereby said pitman is driven to impart a circular, rotative movement to said soil-working member with its moldboard, substantially as described.

8. In an agricultural machine, the combination of ground-wheels, a frame supported by said ground-wheels, a swinging reciprocatory pitman supported by said frame, soil-working members carried by said pitman, and a moldboard adjustably attached to said soil-working members, substantially as described.

9. In an agricultural machine, the combination of ground-wheels, a reciprocatory pitman, a soil-working member carried by said pitman, means whereby said pitman is swingingly suspended, a crank by which reciprocatory motion is imparted to said pitman, gear mechanism connecting said crank to one of said ground-wheels, a slide by which a portion of said gear mechanism is carried, a shifter connected to said slide, and means for holding said shifter comprising an adjustable stem provided with fingers and notched arms carried by said shifter adapted for engagement with said stem, substantially as described.

10. In an agricultural machine, the combination with a reciprocatory pitman, of a hanger by which said pitman is suspended for reciprocatory motion, a crank by which the pitman is driven, and an equalizer having a fulcrum-support and connected to said pitman to govern the movement of said pitman, substantially as described.

11. In an agricultural machine, the combination of a frame, a carrier attached to said frame, a pitman reciprocally suspended from said carrier, a crank by which reciprocatory motion is imparted to said pitman, and an equalizer comprising a pair of bars pivotally connected to said pitman at opposite sides of its point of support by said carrier, one of said bars being fulcrumed to said carrier, substantially as described.

12. In an agricultural machine, the combination of a frame, a carrier attached to said frame, a pitman reciprocally suspended from said carrier, a crank by which reciprocatory motion is imparted to said pitman, and an equalizer comprising a pair of bars pivotally connected to said pitman at opposite sides of its point of support by said carrier, one of said bars being slotted and fulcrumed to said carrier, substantially as described.

13. In an agricultural machine, the combination of ground-wheels, a frame supported by said ground-wheels, a swinging reciprocatory pitman supported by said frame, a soil-working bit carried by said pitman, and means whereby said pitman is driven to cause said bit to move in a circular path, substantially as described.

14. In an agricultural machine, the combination of a swingingly-supported reciprocating pitman, a soil-working member pivotally connected to said pitman, and means for holding said soil-working members in varied inclinations with respect to said pitman, and the soil in which it operates, substantially as described.

15. In an agricultural machine, the combination of a swingingly-supported reciprocating pitman, and a soil-working member carried by said pitman; said member comprising a bit and a moldboard, and means whereby said moldboard may be adjusted into varied degrees of inclination with respect to said bit, substantially as described.

16. In an agricultural machine, the combination of ground-wheels, a frame supported by said ground-wheels, and a sweep pivotally mounted on said frame and extending to the rear of said ground-wheels, substantially as described.

17. In an agricultural machine, the combination of ground-wheels, a frame supported by said ground-wheels, a sweep pivotally mounted on said frame and extending to the rear of said ground-wheels, and means whereby said sweep is adjustably supported, substantially as described.

In testimony whereof I have hereunto set my hand this 6th day of March, 1902.

CHARLES S. WILMETH.

In presence of—
 E. S. KNIGHT,
 M. P. SMITH.